United States Patent [19]
Tully, Jr. et al.

[11] 3,844,972
[45] Oct. 29, 1974

[54] METHOD FOR IMPREGNATION OF GRAPHITE

[75] Inventors: Geoffrey R. Tully, Jr., Alamo; Leslie D. Christensen, Livermore, both of Calif.

[73] Assignee: The United States of America as represented by the United States Atomic Energy Commission, Washington, D.C.

[22] Filed: Oct. 24, 1958

[21] Appl. No.: 769,521

[52] U.S. Cl............... 252/301.1 R, 176/82, 264/.5, 423/261, 117/119, 117/220, 117/228, 106/56
[51] Int. Cl............................................ C09k 3/00
[58] Field of Search............ 23/14.5 A; 204/193.38, 204/154.38; 117/220, 228, 119, 113, 65; 106/56; 252/301.1 R; 176/82; 264/.5; 423/261

[56] References Cited
UNITED STATES PATENTS

| | | | |
|---|---|---|---|
| 2,615,932 | 10/1952 | Marko | 136/122 |
| 2,739,912 | 3/1956 | Smisko | 117/223 |
| 2,754,231 | 7/1956 | Ramadanoff | 117/228 |
| 2,835,608 | 5/1958 | Kanter | 117/65 |

OTHER PUBLICATIONS

Zigrang et al., NAA-SR-240, Issued Aug. 12, 1953, 36 pages.

*Primary Examiner*—Carl D. Quarforth
*Assistant Examiner*—P. A. Nelson
*Attorney, Agent, or Firm*—John A. Horan; Frederick A. Robertson; James M. Hanley

[57] ABSTRACT

Impregnation of graphite with uranyl nitrate dihydrate in tertiary butyl alcohol solution.

7 Claims, 1 Drawing Figure

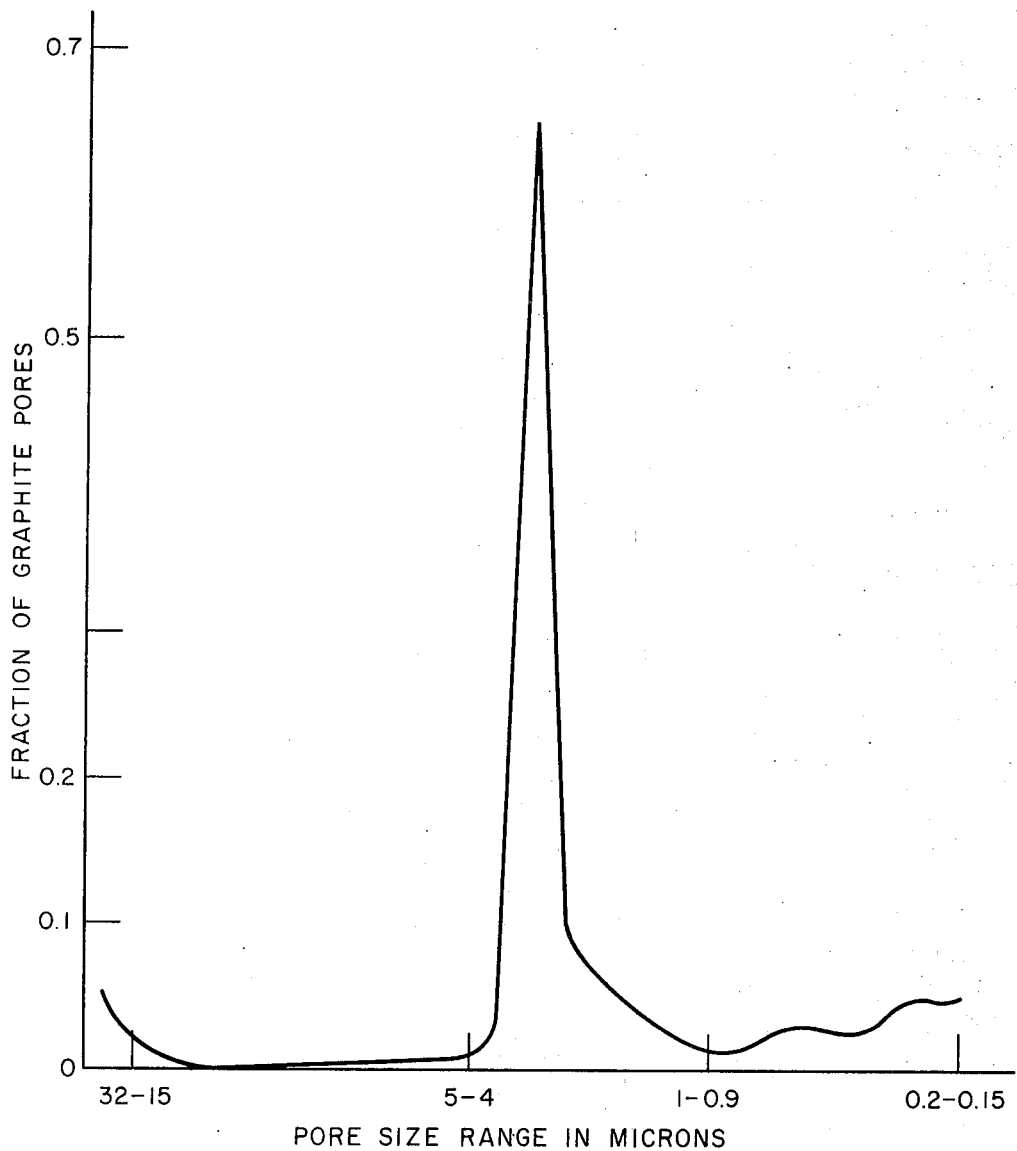

METHOD FOR IMPREGNATION OF GRAPHITE

This invention relates in general to an improved method for the impregnation of graphite with solids, particularly with uranium and other fissionable materials. More specifically this invention relates to an improved method for impregnating graphite with a solvent having a solid dissolved therein and for thereafter evaporating and removing said solvent. The method is particularly applicable to impregnating graphite with solutions of uranyl nitrate dihydrate dissolved in tertiary butyl alcohol, whereby uranium impregnated graphite for neutronic reactors may be produced.

Impregnation of solid porous graphite with another solid is frequently desired in order to imbue the graphite with some special physical characteristic, such as imperviability to liquids, or to increase structural strength, or to decrease chemical reactivity, or to increase the area of contact of the porous graphite and another substance so that chemical activity may be more complete and for other obvious reasons. In the nuclear arts impregnation is frequently necessary to increase the density of graphite by impregnation with a carbonaceous material, and thereafter firing it, whereby moderating, attenuating or other qualities are increased. A more important use is in the preparation of nuclear reactor fuel elements or solid cores where the fissionable material, such as uranium, must be dispersed throughout the graphite. Although adaptable to many reactor systems, such core materials are particularly preferable for high temperature (above 1,500°C) gas cooled solid core reactors suitable either as power reactors or short lived thrust propelled space vehicles, in which the coolant or propellant is preferably introduced into the core through channels or tubes spaced throughout the core to provide optimum heat exchange. By utilizing an impregnated graphite the structural strength of the original graphite is maintained, thereby avoiding difficulties inherent in the use of pressed graphite shapes.

Impregnated graphite also has utility in the neutronic arts as a neutronic heater or fuse material, e.g., for neutronic warning and safety systems, and for manufacture of radioisotopes easily separable from the containing material.

In the prior art, graphite is impregnated with uranium from a solution of uranyl nitrate dihydrate dissolved in tertiary butyl alcohol by a simple contact and sublimation process. A graphite piece is first selected and its porosity determined so that the amount or concentration of impregnant may be determined. A solution containing uranyl nitrate dihydrate dissolved in tertiary butyl alcohol in a concentration calculated to yield the desired uranium-to-graphite ratio is then prepared. Impregnation is accomplished by capillary or other adsorptive action upon contact immersion of the graphite piece. Upon removal from the solution of uranyl nitrate dihydrate, the impregnated graphite piece is subjected to a temperature which quick freezes the solution within the graphite. The solvent is then sublimed in a vacuum chamber at a temperature just under the melting point, about 18°C, leaving the uranium bearing salt behind. The uranium is reduced to the oxide by heating in several stages and may be finally fixed within the graphite by carburization at extremely high temperatures.

The impregnation is easily carried out to depths of a few millimeters provided the impregnant solution is relatively dilute and non-viscous. Depth of impregnation tends to be rather non-uniform and partially dependent upon graphite pore size. The sublimation step is slow, particularly with increasing depth of impregnation. Attempts to increase the rate of sublimation by raising the temperature of the vessel during evacuation, whereby heat is provided to the graphite shape by radiation from the vessel wall, results in bubbling, exudation and migration of the uranium bearing salt, since the solvent sublimes too fast and melts, forcing out the solids, resulting in an uneven loading within the graphite, even though the pore system remains substantially unchanged.

While penetrations to greater depths might seem to be a variable easily controlled, a variety of changes in the procedures based upon temperature-pressure phenomena and adsorption characteristics, do not substantially improve the results. Application of vacuum to outgas impurities prior to impregnation, even to pressures of $10^{-7}$ mm Hg, are almost ineffectual other than to extend penetrations a small additional distance. Use of overpressures alone to force the liquid into the graphite are likewise not successful. Temperatures up to 500° C in a prebake step are not effectual in improving impregnation. In the sublimation step heating the graphite at the interface of the frozen solution by pumping a heated gas into the graphite generally melts the solvent and it runs from the piece carrying the uranium bearing salt with it.

There has now been invented an improved method of impregnating graphite with a solvent having a solid dissolved therein and of subsequently subliming the solvent, leaving the solid therein. The process involves several critical time-temperature-pressure steps. Applied to impregnation of graphite with uranyl nitrate dihydrate dissolved in tertiary butyl alcohol, penetrations of at least 650 mils may be achieved, using uranium concentrations of the order of three times greater than generally possible in the prior art. During sublimation there is little or no exudation, and x-ray density studies indicate an unusual, almost absolutely uniform disposition of uranium. The process comprises degassing and impregnation in a series of vacuum and overpressure cycles applied to a piece of graphite enveloped within the solution, followed by freezing of the impregnated solution, and evacuation and overpressurizing with a heated gas in a critical time-temperature sublimation step. An initial evacuation is preferably carried out before the graphite is enveloped with the impregnant solution. In the actual impregnation, by forced overpressure, the pressure, as well as its duration, is determined empirically for each type of graphite and for each liquid concentration or viscosity, taking into consideration certain limiting factors. In the sublimation the interface of the frozen solvent within the graphite is contacted with a pressurized non-reactive gas heated to a critical temperature, for a critical period of time, as hereinafter explained. The graphite is thereafter subjected to a period of evacuation wherein the sublimed gas is removed. This process is repeated, with alternate overpressures and evacuations, until the entire amount of solvent has been sublimed. Ideally the heated gas contacts and heats only the gas-solid interface. Since the gas contains only a small amount of heat, and since the contact time is limited, the amount of solvent which is melted or sublimed is effectively limited. Any solvent which melts immediately refreezes in place.

Accordingly, an object of the invention is to provide an improved method for the impregnation of graphite with foreign materials.

Another object of the invention is to provide a method for impregnating graphite with liquids, or with solvents having a solid dissolved therein.

Another object is to provide a method for impregnating graphite with a uranium compound.

Another object of the invention is to provide a method for impregnating graphite with tertiary butyl alcohol having uranyl nitrate dihydrate dissolved therein, by alternate cycles of degassing the graphite and forcing the liquid therein under pressure.

A further object of the invention is to provide a method for sublimation from graphite of a solvent having dissolved therein a solid, particularly uranyl nitrate dihydrate, by contacting the interface with warm gases under pressure for short periods of time and thereafter evacuating said gases and said sublimed solvent without migration of said solid.

A further object of the invention is to provide a method for impregnating graphite with uranyl nitrate dihydrate comprising impregnating graphite with uranyl nitrate dihydrate dissolved in tertiary butyl alcohol and thereafter removing said solvent by freezing the solution and alternately contacting the interface with a warm non-reactive gas under pressure for a fhort period short time and evacuating said gas and said sublimed solvent without migration of said solvent.

A further object of the invention is to provide a method for impregnating graphite with uranyl nitrate dihydrate comprising impregnating graphite with uranyl nitrate dihydrate dissolved in tertiary butyl alcohol by alternate cycles of degassing said graphite enveloped with solution and forcing the liquid therein under pressure, and thereafter removing said solvent by freezing the solution and alternately contacting the frozen interface with a warm inert gas under pressure for short periods of time and evacuating said gases and said sublimed solvent without migration of said solid.

In the practice of the invention there is provided a high quality graphite, most frequently reactor grade, in particular shapes and having about 15 percent voids. While process equipment may be improvised, conveniently there is provided a jacketed glass or stainless steel container with open top large enough to accommodate the pieces to be impregnated, yet in which a critical amount of uranium-235, preferably as uranyl nitrate dihydrate, dissolved in tertiary butyl alcohol or other solvent, will not easily be contained. A conical-shaped viser in the bottom of the container is used to prevent accumulation of critical amounts of solids in the event of precipitation. In order to fully control the process the inside of the container should be observable at all times. A transparent top gives sufficient visibility. Inlet and outlet means for liquids and means for maintaining vacuum and gaseous pressures over the top of the container must also be provided, as well as means for freezing the impregnated graphite and for heating and cooling the container through the jacket. A gas non-reactive with the constituents should be provided at variable temperatures and pressures as will be more specifically described hereinafter. For the evacuating step a simple mechanical pump suffices. In accordance with the invention the graphite is placed in the container, preferably on a rack, but without other support. In the preferred embodiment the graphite is evacuated prior to immersion to save time in subsequent steps. Uranyl nitrate dihydrate or other suitable salt, is dissolved in a suitable solvent such as tertiary butyl alcohol containing additives as hereinafter described so that the uranium concentration corresponds to that desired to produce a given carbon to uranium ratio in graphite of the porosity undergoing impregnation. Alternatively, other solid-bearing liquids may be provided for other embodiments. The solution is heated to a temperature above its jelling or freezing point, e.g., 50° to 70° C, and a sufficient quantity is transferred by vacuum into the container to fill it beyond the point wherein the graphite piece will be entirely immersed therein after impregnation. A vacuum pressure, −19 in. Hg or less is applied to the volume over the solution, which volume should be several times smaller than graphite volume to avoid solvent loss and consequent change of concentration. The pump is then shut off from the container and the graphite allowed to degas. When entrained gas ceases to pass through the liquid to the surface thereof, the liquid is pressurized with non-reactive gas such as nitrogen or argon at 10 to 30 psi, although this pressure is not particularly critical, as will be discussed hereinafter.

After a period of time of the order of that required for degassing the vacuum-overpressure cycle is repeated. Approximately 650 mils penetration can be achieved within about 12 hours. This distance varies with types of graphite and processing variables and may be extended by increasing processing time. The solution is then dropped away or otherwise removed from the container and the impregnated solution is frozen, as by contact with liquid nitrogen. The temperature of the frozen solution may be allowed to rise to a point near the melting point, although this is not necessary. The graphite piece is next subjected to a vacuum and then to an overpressure with a non-reactive gas such as argon heated to the critical temperature of 40° to 55° C whereby a small increment of solvent is sublimed. The overpressure is continued for only about 1 or 2 minutes and the graphite piece is then again evacuated, removing the sublimed solvent. The pressures involved are not critical and there is no particular pressure at which an advantageous result is obtained. A total time of from 20 to 40 hours are required to completely remove all solvent from blocks having maximum penetration of 650 mils. There results a graphite piece in which the uranium salt is uniformly dispersed throughout the impregnated area. The salt may be converted to uranium oxide by heating.

Ordinarily, where the impregnated graphite is to be used in the nuclear arts, a graphitic material of purity and other properties satisfactory for use in neutronic reactor is selected, e.g., graphite of very low content of boron and other reactor poisons and of proper structural and other properties. No pre-treatment of the graphite is necessary, although pre-baking and pumping down increase the initial penetration. The graphite pieces will generally be in the shape of core pieces which are assembled later to form a reactor core configuration, e.g., a cylindrical core having axial bores therethrough for passage of gaseous or liquid coolant. The entire core may be coated with a heat resistant material, e.g., NbC or ZrC, after impregnation to preclude uranium diffusion or graphite erosion. Other fabrication and assembly techniques may be used which are known in the art but which are no part of the present invention. Other materials may be used to impregnate the graphite for purposes other than use in neutronic reactors, as discussed hereinabove.

Accordingly, after selection of the graphite pieces, the graphite density distribution and total percent void volume are next determined. The density distribution must be uniform in order to insure uniform uranium distribution. Total available void volume or "available porosity," must be known to calculate the uranium impregnant concentration necessary to impregnate the graphite with enough uranium to produce a critical assembly for the particular reactor configuration chosen. Requirements generally vary from one atom uranium per 350 atoms graphite to one atom uranium per 2,000 atoms graphite. Ease of penetration is partially a function of pore size. Graphite with an average of about 15 percent voids has been found well suited for most uses; typical pore size distribution of such graphite is shown in the accompanying figure.

A solution is next made up of the material with which it is desired to impregnate the graphite. While the uranium salt uranyl nitrate dihydrate and the solvent tertiary butyl alcohol are represented as the preferred embodiments, it is obvious that other solid materials and other solvents may be substituted. The process is limited not by the character of the solution, so long as it is relatively non-viscous and capable of wetting graphite, but rather by the character of graphite. Accordingly, a solution of uranyl nitrate dihydrate dissolved in tertiary butyl alcohol is prepared which will result in a carbon to uranium ratio in the range 700:1 to 2,000:1, such solutions contain from 15 to 45 wt. pct. uranyl nitrate dihydrate, respectively. Two impregnations of the 45 percent solution are required for 350:1 loading. If used immediately after preparation the solution might, under minimal requirements, be impregnated under the process described herein; however, such solutions tend to precipitate the uranium from a solvolysis reaction occurring within 2 or 3 days or less and hence such solutions containing an additive which prevents such precipitation for a longer period of time are preferred. Additives consisting of a material selected from the group comprising lactic acid, acetic acid, monochloroacetic acid and acetic anhydride, are preferred, as described in copending U.S. Pat. application Ser. No. 769,520, filed Oct. 24, 1958, Robert E. Elson, Raymond D. Heminger and Geoffrey R. Tully, Jr., Stabilized Uranyl Nitrate Composition and Uranium Impregnation Method. In accordance with the invention described in the above application one of the stabilizing agents is added to and dissolved in the solution of uranyl nitrate dihydrate (UND) in tertiary butyl alcohol (TBA) at a temperature above 50° C, in certain critical amounts, as follows: lactic acid, 0.7 to 1.1 moles per mole UND; acetic acid, 0.6 to 1.2 moles per mole UND; monochloroacetic acid, 0.6 to 1.2 moles per mole UND; and acetic anhydride, 0.1 to 0.5 moles per mole UND. Solutions containing one of the above additives in the specific amounts stated are in general stable for 2 weeks or more. Stability time varies with the concentration of the three constituents as disclosed in the reference. For example, solutions containing varying amounts of lactic acid are stable for periods of time from 2 to over 45 days. Two other properties also vary with time when these additives are used; namely, solidification and freezing temperatures. Solidification temperatures for given solutions, at which temperatures a gel is formed, all tend to become lower over a period of time. The solidified or frozen solution may be dissolved upon raising the temperature of the solution above the solidification temperature as long as the solution remains stable. The solution must normally be maintained at a temperature of 40° to 50° C in order to avoid solidification and this is the temperature most advantageous for impregnation. Unstable precipitated solutions cannot be dissolved by raising the temperature.

After preparation of the impregnant solution, the graphite piece is disposed in the container in which the impregnation is to take place, the lid is fastened down, and the piece is evacuated and then enveloped by the impregnant solution. Enough excess liquid must be present to cover the graphite during impregnation. The air space above the solution is then subjected to a vacuum preferably approaching −19 in. Hg. Pumping cannot be maintained over the solution since the TBA rapidly evaporates. A vessel with a rather small air space is used to keep evaporation to a minimum. Once the desired vacuum is achieved the vessel is shut off from the pump. Under normal conditions a vacuum application time of one-half hour is sufficient. Bubbling of the entrained air out through the liquid is noticeable during the evacuation period, and it generally slows down to a minimum at the end of this time. An overpressure of air or some other gas is then applied to the solution. Gauge pressures of 30 pounds have been sufficient in all situations, although enhanced results may be obtained at pressures of 10 psig or lower. The overpressure is continued for a length of time of the order of that used for the vacuum step. The vacuum-pressure cycle is repeated until the desired penetration is achieved. Preferred impregnation temperature is 50°–70° C. A 650 mil penetration can be achieved in about 12 hours.

No explanation can be given with certainty why continued vacuum-overpressure cycles bring about a successively greater penetration than that obtained with a single outgassing step followed by a soaking or wetting step with or without an overpressure.

In general the purity, available voids and density distribution and other characteristics of graphite all vary widely. These variables affect the depth of penetration and distribution. For impregnation of fissile fuel materials the graphite will ordinarily be restricted to reactor grade, or near reactor grade, graphite with 10–20 percent voids, extreme purity, etc., having a pore size distribution similar to that shown in the figure. All values cited in this present specification have been obtained from impregnation experiments using this type of graphite.

Viscosity and surface tension of the impregnant solution determine the depth of penetration for any given solution and variation in process. These factors are of course related directly to the concentration of the solvent. The relationship between viscosity, concentration and carbon to uranium ratio is as follows:

| Atom C/U Ratio | Uranium Conc. as Uranyl Nitrate Dihydrate (%wt) | Viscosity (centipoises) |
|---|---|---|
| 800 to 1 | 45 | 28 |
| 300 to 1 | (55 g/ml) | — |
| 2000 to 1 | 18 | |

The maximum amount of uranium that can be impregnated directly from a single solution without reimpregnation is 55 g uranyl nitrate dihydrate per 100 g tertiary butyl alcohol impregnant solution. Where higher ratios are desired impregnation must be repeated after sublimation of the solvent, and bake out. A ratio of 800 to 1 is closely representative of the amount of uranium required for a prototype reactor.

Vacuum required in each cycle to bring about a satisfactory outgassing rate is known fairly exactly. Some outgassing is obtained at all vacuum pressures. At pressures lower than 10 in. vacuum, (−10 in. Hg) bubbles commence to emanate from the graphite at a very fast rate. At vacuums lower than approximately −19 in. Hg. the solvent, tertiary butyl alcohol, boils, limiting the lowest workable pressure to this amount for this solvent. However, the maximum outgassing rate is apparently approached at this pressure, since the rate of bubble formation is excessive at pressure well below this limit. The pressure at which bubbles initially begin to form gradually approaches the −19 in. Hg limit as more and more cycles are completed. The presence of the tertiary butyl alcohol is necessary to the outgassing portion of the cycle, since the solution within the blocks would evaporate, if the block were not immersed.

Optimum temperature range for the impregnation process is 50° – 70° C, although beneficial results may be obtained below and above this range subject to certain limitations. Starting at temperatures below 50° C the gelling or solidification of the solution occurs, depending upon the concentration and age of the solution, as discussed hereinbefore. Above 70° C the vapor pressure of the solvent is so high as to interfere with the degassing step.

That positive pressure, or overpressure, is fairly optimum at from 10 to 30 psi may be shown from the data of Table I in which all variables of the impregnation are held constant except time and overpressure.

TABLE I

| Overpressure (psig) | Total Process time (hr) | Penetration (mm) |
|---|---|---|
| Atmosphere | 2 | 7 |
| 6 | 2 | 14 |
| 10 | 4 | 19 |
| 10 | 2 | 15 |
| 10 | 6 | 20 |
| 20 | 2 | 19 |
| 30 | 6 | 20 |

No attempt was made in this experiment to achieve greater penetrations.

Processing time in the impregnation evacuation step is determined by the length of time during which large amounts of gas are outgassed, as visually evidenced by the rate at which gas bubbles pass through the solution. This time is generally about one hour at commencement of the cycling and thereafter decreases to one-half hour. The overpressure time is generally limited to one-half hour since impregnation depth is not increased by increasing overpressure time alone. From the number of cycles required for additional increments of penetration, it is apparent that there is possibly no ultimate limit to the depth of penetration achievable for most applications under the process conditions presently used.

Following impregnation of the graphite, the impregnant solution is removed from the container and liquid nitrogen placed therein instead of the impregnant solution, or the graphite pieces are otherwise removed and contacted with liquid nitrogen elsewhere, whereby the impregnated solution is frozen. Alternatively, other freezing means may be used. The temperature of the impregnated graphite must be maintained below the freezing point of the impregnant solution during the subsequent sublimation process, which is conveniently carried out in the original container. The freezing point will of course vary with the ratios of constituents of the impregnant solution and the length of time after preparation, as discussed hereinbefore; however, when freezing is brought about by liquid nitrogen or other low temperature freezing means, no particular precautions need to be taken to determine whether the solution remains frozen. The container is next evacuated by a mechanical pump. A small amount of non-reactive gas such as argon heated to a constant temperature above the melting point of the frozen solution is then introduced into the container whereby contact is made between the heated gas and the impregnated graphite. The heat contained in the gas serves to heat and sublime a small incremental layer of solvent at a rate much faster than that obtained by pumping on the graphite alone; by limiting the duration of contact of the heated gas with the frozen impregnant, very little melting and no exudation occurs. Also, because the temperature of the frozen solution is below the melting point, any of the solution which is melted on the interface is refrozen by the flow of heat into the mass of frozen solution.

The temperature to which the non-reactive gas must be heated has been found to be particularly critical. Below 40° C the rate of heating, and consequently of sublimation is too slow to allow practical removal of the solvent. Above about 55° C the vapor pressure of the solvent tertiary butyl alcohol is too high to yield acceptable results, i.e., the solvent sublimes so rapidly that the uranium bearing salt is exuded or otherwise not deposited properly. Accordingly, the operating temperatures lie in the critical range of 40° to 55° C. The gas used is not important as long as it does not react with the constituents. Inert gases including argon are used. Neither are the overpressure and vacuum pressure values particularly critical to the process. The overpressure must be sufficient merely to cause the heated gas to come into contact with the frozen interface. In practice an overpressure of 30 psi is used. The contact time is generally limited to one or two minutes. Longer times generally give rise to excessive melting, and the rate of sublimation is too slow with shorter times. However, the time may vary with different conditions, e.g., different solvents and melting points. The vacuum pressure need be continued only for a time sufficient to remove all of the sublimed solvent. A vacuum pressure of 100–500 microns Hg for 10–30 minutes has been found satisfactory. A total time of 20 to 40 hours has been found necessary to completely remove all solvent from large blocks where the maximum depth of penetration was 650 mils. Proportionate times would be required for other penetration depths and different grades of graphite.

EXAMPLE I

A preliminary experiment was undertaken to determine the relation between overpressure, process time and depth of penetration in the impregnation steps. A solution of 1.20 g/ml density was prepared, containing 45 wt % uranyl nitrate dihydrate, 55 wt % tertiary butyl alcohol to which was added 0.8 moles of lactic acid per mole of uranyl nitrate dihydrate. The solution was used to impregnate blocks of "ATJ" grade graphite, near reactor grade in purity, having about 15 percent voids and a fairly uniform porosity, manufactured by Union Carbide & Carbon Corporation. All variable were held constant except pressure and time. Results are shown in Table I where it may be seen that the depth of penetration is a function of pressure and time.

EXAMPLE II

Three pieces of graphite were selected for processing to determine the penetration characteristics of graphite of different sizes. The first piece was National Carbon Division, Union Carbide & Carbon Corporation, 15 percent voids, near reactor grade, "ATJ" graphite in the shape of a solid rectangular parallelpiped of dimensions 1.3 by 1.3 by 3 inches. Greatest distance between surfaces was 1300 mils, or 650 mils maximum impregnation. The second piece was "ATJ" graphite in the shape of a hexagon 3½ inches between parallel sides and 4 inches long. Along the longitudinal axis were 177 0.188 inch diameter holes spaced so that the maximum penetration was 65 mils. The third piece was C-18 graphite, produced by the same company and having larger pores and lower purity, and a somewhat lower density. This piece was also in the shape of a hexagon with 6 inches between parallel surfaces and being 5.2 inches in length. Similarly it contained one one-eighth inch diameter hole down its center. The three pieces were pretreated by placing them in a vacuum of 29 microns for 16 hours while the temperature was maintained at 50° C. The pieces were then enveloped directly within a solution of 43 wt % uranyl nitrate dihydrate dissolved in tertiary butyl alcohol containing 0.8 moles of lactic acid per mole of uranyl nitrate dihydrate. The solution had a density of 1.200 and a viscosity of 28 centipoises. Three vacuum-overpressure cycles were then applied as follows, while holding the temperature at 50° C:

| | | |
|---|---|---|
| Vacuum | −14 in. Hg | 5 min. |
| Pressure | 10 lb/sq.in. | 25 min. |
| Vacuum | −14 in. Hg | 25 min. |
| Pressure | 11 lb/sq. in. | 15 min. |
| Vacuum | −14 in. Hg | 20 min. |
| Pressure | 10 lb/sq.in. | 25 min. |

The solution was then dropped away from the pieces and frozen in liquid nitrogen. The solvent was removed by sublimation under a vacuum, after which the uranium was converted to the oxide and wafers were cut out of the center of each piece along its longitudinal axis. X-ray examination showed a 14–18 mil penetration of the solid piece and complete penetration of the hex block with 177 holes. Results with the C-18 graphite were irregular, but it was largely impregnated on a percentable basis as would be expected with a lower density. On a weight basis the following average uranium to carbon ratios were established; 4.5 g uranium per 100 grams carbon for the C-18 graphite; 2.4 g U/100 g C for the ATJ graphite with the large number of holes; and 1.8 g U/100 g C for the solid ATJ piece.

EXAMPLE III

Five blocks of ATJ and BPB grade graphite, hexagonally shaped with flat parallel ends 5.2 inches in length and width across the side flats, were selected for impregnation. The pieces contained bores longitudinally along the hexagonal axis such that the maximum possible depth of penetration would be 650 mils. ATJ grade graphite is a near reactor grade graphite having about 10–20 percent voids. BPB is an experimental grade also of high quality, produced by Union Carbide, and having 10–20 percent voids. The blocks were evacuated and outgassed for 16 hours at 50° C. Impregnation was carried out with a TBA solution containing 0.8 moles lactic acid per mole uranyl nitrate dihydrate and having an average solution density of 1.120 and viscosity of 27 cp. Uranium concentration was 21.5 g uranium per 100 grams solution. Impregnating procedure included an overpressure-vacuum cycle at 49° C consisting of a 20 min-30 psi over-pressure followed by 20 min at −17 in. Hg, the total cycling time being 12 hours 50 minutes. The impregnated blocks were washed four times by 15 seconds immersions in clean tertiary butyl alcohol and were then frozen solid by contact with liquid nitrogen. The sublimation cycle consisted of a 2 minute overpressure with argon gas heated to 50° C followed by a 10 minute evacuation below 500 microns. The entire sublimation of the impregnated solvent was completed at the end of 66 hours. The blocks of impregnated uranium were then baked in vacuum for 3 hours at 100° C and 50 microns Hg pressure, and subsequently for 20 hours at 275° C and 50 microns Hg pressure. The uranium was now in the oxide form, at which point sections were made of several of the blocks and various analyses performed. Analyses showed the excellent results tabulated below:

| | Block 323 | Block 428 |
|---|---|---|
| Graphite type | Nat'l Graphite ATJ | Nat'l Graphite BPB |
| Geometry, Max penetration | 650 mils | 650 mils |
| Density of graphite | 1.658 | 1.676 |
| Loading, g U/100 g C | 2.79 | 2.84 |
| % available space loaded | 101.64 | 97.74 |
| % solution sublimated by wt. | 59.78 | 50.77 |
| % recovery (g U after bakeout/g U in solution adsorbed) | 104.8 | 99.1 |

The values for "percentage available space loaded" are based on a value for the total available space determined from weight changes after initial impregnation with alcohol alone. The values for "percentage recovery" are based upon the amount of uranium calculated to be in the increment of solution impregnated, and would of course be subject to correction for the variations in concentration caused by evaporation and for other errors.

An actual nuclear reactor design incorporating graphite blocks uniformly impregnated with enriched uranium oxide is discussed in "Proceedings of the 1953 Conference on Nuclear Energy," pages A-15 to A-33, held at the University of California at Berkley, Sept. 9-11, 1953, and available from California Book Company, 2310 Telegraph Ave., Berkeley 4, Calif. See also Glasstone, "Principles of Nuclear Reactor Engineering," (D. Van Nostrand Co.), page 725, paragraph 12.31, and Science, 119,15 (1954). In the typical research reactor described, the impregnated graphite core comprises approximately 800 liters of graphite moderator having a total uranium-235 mass of approximately 3.5 kilograms. Uranium-235 concentration is approximately 4.5 milligrams/cc of graphite. The graphite is in the form of a40 stacked blocks which have physical dimensions of 4.18 inches on a side, 21 inches long, and a 1.25 in. diameter coaxial hole, extending the entire length. In operation, the coaxial holes in the graphite stacks are used to convey a coolant fluid, thereby continuously cooling the fuel blocks.

Design of a gas cooled mobile prototype reactor comprising a uranium impregnated graphite core material having axial bores therethrough for flow of liquid and/or gas coolant or propellant is described in detail in UCRL-4960, entitled Tory I Reactor, dated Sept. 1957, University of California Radiation Laboratory, Berkeley, Calif. In the reactor as designed, the fuel and core operate at temperatures up to 3,000° C while a heavy water reflector is maintained at room temperature and the liquid gas coolant enters the reactor at a very low temperature and emerges at a temperature approximating that of the core. Nitrogen, hydrogen and/or ammonia is used as coolant under an initial pressure of 305 psi. Because of the high temperature of operation a carbon wool blanket is preferably disposed between the core and heavy water reflector. Operating time is a few minutes. The core comprises 19 graphite columns, hexagonal or modified hexagonal cross sections 5.4 inches across flats, each composed of ten 5.2 inch long graphite blocks impregnated with 92 percent $U^{235}$ at a carbon to uranium ratio of 800:1. Total weight of $U^{235}$ is about 34.4 pounds, depending upon the core configuration. End reflectors are graphite, and the axial reflector comprises 12,400 pounds of heavy water.

While the invention has been disclosed with respect to several preferred embodiments, it will be apparent to those skilled in the art that numerous variations and modifications may be made within the spirit and scope of the invention and thus it is not intended to limit the invention except as defined in the following claims.

What we claim is:

1. A process for impregnating porous graphite with uranyl nitrate dihydrate dissolved in tertiary butyl alcohol and thereafter removing said solvent, comprising the steps of subjecting said graphite to a vacuum to degas same, enveloping said graphite piece with said solution and pressurizing an air-space thereover limited in volume preferably to a space about one-fifth the total volume of the graphite piece to force said solution into said graphite and thereafter evacuating said air-space to a pressure approaching, but not lower than, −19 in. Hg, said evacuated space being thereafter closed to the evacuation means for a period of time of the order of at least 30 minutes for maximum penetration in the overpressure step, repeating said evacuation and pressurization steps until said graphite piece is impregnated to a desired depth, removing said piece from said solution, freezing said impregnated solution, subjecting said graphite piece containing said frozen solution to a vacuum, contacting said graphite piece with an overpressure of non-reactive gas heated to a temperature in the range of from 40° to 55° C for a period of time not longer than 2 minutes, evacuating said gas and sublimed solvent from said graphite, and alternately repeating said latter pressure and vacuum steps until all of said solvent has been removed.

2. A process for impregnating graphite having 10 to 20 volume percent voids and uniform pore distribution in the general range of 0.5 to 15 microns in diameter, comprising the steps of preparing a solution off uranyl nitrate dihydrate dissolved in tertiary butyl alcohol solvent of containing an additive selected from the group consisting of lactic acid, acetic acid, monochloroacetic acid and acetic anhydride, said solution being maintained at a temperature above solidification and below about 70° C and having a viscosity in the range of from 10 to 40 centipoises, enveloping said graphite piece with a quantity of said solution sufficient to cover said piece during impregnation of the entire voids space desired to be impregnated, evacuating an air-space smaller than said graphite piece over said solution to a pressure approaching, but not lower than about −19 in. Hg, shutting off said evacuating means upon reaching said pressure for a period of time of at least 30 minutes for maximum penetration during the over-pressure step, whereby bubbles of gas from said graphite seek the level of said evacuated air-space, pressurizing said air-space over said solution with a non-reactive gas for at least 30 minutes at a pressure of 30 psig to force said solution into said graphite, alternately repeating said evacuating and pressurizing steps until impregnation to the desired depth is completed, separating said piece from said solution, freezing said impregnated solution, subjecting said impregnated, frozen graphite to a vacuum, contacting said impregnated, frozen graphite with an overpressure of non-reactive gas heated to a temperature in the range of from 40° to 55° C for a period of time not longer than 2 minutes, whereby a small amount of solvent is sublimed without exudation and alternately repeating said latter pressure and evacuation steps until all of said solvent has been removed.

3. The process of claim 2 in which said impregnant solution is maintained at a temperature in the range of from 50° to 70° C.

4. The process of claim 2 in which the overpressure in said sublimation step cycle is within the range of from 10 to 30 psig.

5. The process of claim 2 in which the vacuum pressure in said sublimation step cycle is 100 to 500 microns Hg, said vacuum being maintained for a period of from 10 l to 30 minutes.

6. A process for impregnating graphite having 10 to 20 volume percent voids and uniform pore distribution in the general range of 0.5 to 15 microns in diameter comprising the steps of preparing a solution of uranyl nitrate dihydrate dissolved in tertiary butyl alcohol and containing an additive selected from the group consisting of lactic acid, acetic acid, monochloroacetic acid and acetic anhydride, said solution being maintained at a temperature above solidification and below about 70° C and having a viscosity in the range of from 10 to 40 centipoises, enveloping said graphite piece with a quantity of solution sufficient to cover said piece during impregnation of the entire voids space desired to be impregnated, evacuating an air-space less than one-fifth the size of said graphite piece over said solution to a pressure approaching, but not lower than about −19 in. Hg, shutting off said evacuating means whereby bubbles of gas from said graphite seek the level of said evacuated air-space for a period of time of the order of at least 30 minutes, pressurizing said air-space over said solution with a non-reactive gas to force said solution into said graphite for a period of at least 30 minutes at a pressure of 30 psig for maximum penetration, and alternately repeating said evacuation and pressurization steps until impregnation to the desired depth is completed.

7. A process for impregnating solid graphite having 10 to 20 volume percent voids and uniform pore distribution in the general range of 0.5 to 15 microns diameter with at least 2.00 grams uranium per 100 grams graphite to a depth of at least 650 mils, the steps comprising preparing a solution of uranyl nitrate dihydrate dissolved in tertiary butyl alcohol solvent, said solution containing more than about 20 grams uranium per 100 grams of solution together with an additive selected from the group consisting of lactic acid, acetic acid, monochloroacetic acid and acetic anhydride, said solution being maintained at a temperature above solidification and below about 70° C and having a viscosity in the range of from 10 to 40 centipoises, outgassing a graphite piece to be impregnated to a depth approaching at least 650 mils enveloping said graphite piece with a quantity of said solution sufficient to cover said piece during impregnation of the entire void space desired to be impregnated, said solution being maintained at a temperature of about 50°C during the impregnation cycle, evacuating an air-space about one-fifth the volume of said piece over said solution to a pressure of about −19 in. Hg, shutting off said evacuating means from said air space, whereby bubbles of gas from said graphite seek the level of said evacuated air-space, pressuring said air-space over said solution with a non-reactive gas at an over pressure of 10 to 30 psig for a period of time from 20 to 30 minutes to force said solution into said graphite, alternately repeating said evacuating and pressurizing steps for at least about 12 hours, whereby impregnation to a depth of at least about 650 mils is obtained, separating said piece from said solution, freezing said impregnated solution, subjecting said impregnated graphite containing said frozen impregnant to a vacuum of at least 500 microns Hg for a period of at least 10 to 30 minutes, contacting said impregnated, frozen graphite with 10 to 30 psig overpressure of a non-reactive gas heated to a temperature in the range of 40° to 55°C for a period of time not longer than about 2 minutes, whereby small amounts of solvent are sublimated, and alternatively repeating said latter pressure and evacuation steps until all of said solvent has been removed.

* * * * *